A. Hunter,
Cage Trap,
Nº 26,947.     Patented Jan. 24, 1860.
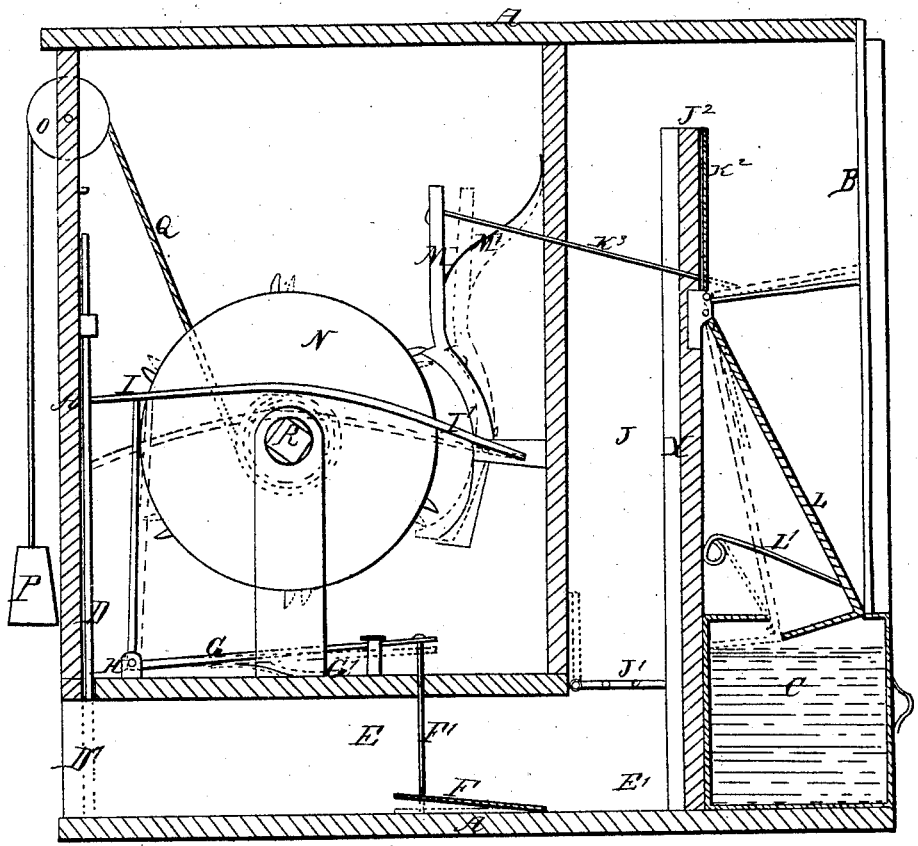
Witnesses.
H. E. Clifton
J. N. B. Coffin Jr.
Inventor:
Andrew Hunter

UNITED STATES PATENT OFFICE.

ANDREW HUNTER, OF HEREFORD, VIRGINIA, ASSIGNOR TO HIMSELF, AND PETER HUNTER, OF ADAMS COUNTY, OHIO.

RAT-TRAP.

Specification of Letters Patent No. 26,947, dated January 24, 1860.

*To all whom it may concern:*

Be it known that I, ANDREW HUNTER, of Hereford, in the county of Mason and State of Virginia, have invented a new and useful Improvement in Rat-Traps; and I do hereby declare that the following is a full and exact description thereof, reference being had to the accompanying drawings, and to the letters of reference marked thereon, making part of this specification.

The nature of my invention relates, 1st, to the arrangement and combination of parts for the purpose of entrapping the animal, and, 2ndly, to the combination of parts by which the animal is made to re-set the trap, substantially as hereinafter represented and described.

With reference to the accompanying drawing which represents a sectional elevation of the trap, A, is the case.

B, is a glass window.

C, is a water tank.

D, is a drop-gate to close the door $D^1$ where the animal enters the trap in pursuit of bait which should be placed in passage E, beyond the platform F, near $E^1$.

The passage E, communicates by a light open-work trap-door $J^1$, of wire grating, with the passage J, which is furnished with a rough surface X, to assist the animal in ascending or climbing up to the point $J^2$.

The platform F, is jointed to rod $F^1$, which is connected to bell-crank G. Crank G, is furnished with the spring $G^1$, which holds platform F, and the end of bell crank G, in an elevated position, and being pivoted at H, its upper end is thereby pressed under the spur I, on lever $I^1$, and the end of lever $I^1$ entering a hole in the drop gate D, holds it in an elevated position until an animal steps upon platform F, and so depresses it and causes the drop-gate D, to fall, so shutting the animal into the passage E. The animal now seeing the light which is admitted through window B, and passage J, rushes toward its source, and lifting the pivoted trap door of wire grating $J^1$, as he goes, he climbs up the said passage J, to the point $J^2$, from which point he attempts to jump through window B, but is intercepted by the glass and falls upon platform K, which being pivoted for the purpose tilts him upon the platform or spring door L, which in turn gives way and deposits him in the water-tank C, and by the action of its spring $L^1$ immediately closes the passage after him.

The tilting platform K, is connected by its upright part $K^2$, and the rod $K^3$, to the upper end of escapement M. A spring $M^1$ presses the upper end of escapement M, toward wheel N, and so holds platform K, in a horizontal position until a rat falls upon it and passes down after which it causes said platform to resume its horizontal position. Around the shaft or a barrel on the shaft or axle of wheel N, is coiled a cord Q, which passing over pulley O, is connected to weight P, by means of which said wheel N, is made to rotate one tooth whenever the escapement M, is operated by an animal falling on platform K, as described. The turning of this wheel thus one tooth brings a tooth in contact with the spur I, on lever $I^1$, so as to lift it and therewith the drop-gate D, the end of bell-crank G, at the same time slipping under spur I, by means of the action of spring $G^1$, so holding open the drop-gate. The trap is thus reset in readiness for the next rat, which of course will in like manner enter, close the drop-gate, drown himself and set the trap for his successor as described. When the weight P, runs down it may be wound up by applying a key at R.

The parts may be made of any suitable material usually employed for similar purposes.

Having described the construction and operation of my improvement, what I claim as new and desire to secure by Letters Patent is as follows:

1. I claim the arrangement of the bell-crank G, in connection with the drop-gate D, and platform F, substantially as and for the purpose set forth.

2. I claim the combination of mechanism by means of which the animal is made to reset the trap, consisting essentially of the tilting platform K, escapement M, escapement wheel and axle N, cord Q, and weight P, substantially as described.

In testimony of which invention I have hereunto set my hand.

ANDREW HUNTER.

Witnesses:
H. E. CLIFTON,
D. N. B. COFFIN, Jr.